(12) United States Patent
Tano et al.

(10) Patent No.: US 8,715,484 B2
(45) Date of Patent: May 6, 2014

(54) PROCESS FOR PRODUCING NEEDLE COKE FOR GRAPHITE ELECTRODE AND STOCK OIL COMPOSITION FOR USE IN THE PROCESS

(75) Inventors: Tamotsu Tano, Yamaguchi (JP); Takashi Oyama, Yamaguchi (JP); Toshiyuki Oda, Yamaguchi (JP); Ippei Fujinaga, Yamaguchi (JP); Hiromitsu Hashisaka, Yamaguchi (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 386 days.

(21) Appl. No.: 13/062,106

(22) PCT Filed: Sep. 4, 2009

(86) PCT No.: PCT/JP2009/065496
§ 371 (c)(1),
(2), (4) Date: Apr. 20, 2011

(87) PCT Pub. No.: WO2010/029895
PCT Pub. Date: Mar. 18, 2010

(65) Prior Publication Data
US 2011/0186478 A1    Aug. 4, 2011

(30) Foreign Application Priority Data
Sep. 9, 2008    (JP) ................ P2008-231024

(51) Int. Cl.
*C10B 55/00*    (2006.01)
*C10B 57/04*    (2006.01)

(52) U.S. Cl.
USPC ........... 208/50; 206/14; 206/22; 206/23; 206/53

(58) Field of Classification Search
USPC .................... 208/14, 22, 23, 50, 53
See application file for complete search history.

(56) References Cited

U.S. PATENT DOCUMENTS

| 2,775,549 | A | 12/1956 | Shea, Jr. |
| 2,922,755 | A | 1/1960 | Hackley, Jr. |
| 3,547,804 | A | 12/1970 | Noguchi et al. |
| 3,617,515 | A | 11/1971 | Bloomer |
| 3,759,822 | A | 9/1973 | Folkins |
| 3,817,853 | A | 6/1974 | Folkins |
| 4,043,898 | A | 8/1977 | Kegler |
| 4,075,084 | A | 2/1978 | Skripek et al. |
| 4,130,475 | A | 12/1978 | Cameron et al. |
| 4,490,244 | A | 12/1984 | Stecker |
| 5,028,311 | A | 7/1991 | Shigley |
| 5,695,631 | A * | 12/1997 | Eguchi et al. ............... 208/50 |
| 7,604,731 | B2 * | 10/2009 | Bhattacharyya et al. ....... 208/67 |
| 7,959,888 | B2 * | 6/2011 | Oyama et al. ............ 423/445 R |
| 7,964,173 | B2 * | 6/2011 | Oyama et al. ............ 423/445 R |
| 8,007,658 | B2 * | 8/2011 | Miller et al. ............... 208/44 |
| 8,007,659 | B2 * | 8/2011 | Miller et al. ............... 208/44 |
| 8,007,660 | B2 * | 8/2011 | Miller et al. ............... 208/50 |
| 8,137,530 | B2 * | 3/2012 | Tano et al. ............... 208/14 |
| 8,197,788 | B2 * | 6/2012 | Oyama et al. ............ 423/445 R |
| 8,226,921 | B2 * | 7/2012 | Oyama et al. ............ 423/445 R |

FOREIGN PATENT DOCUMENTS

| CN | 85107441 | 4/1986 |
| CN | 1245197 | 2/2000 |
| CN | 1382761 | 12/2002 |
| JP | 63260980 | 10/1988 |
| JP | 2142889 | 5/1990 |
| JP | 5-105881 | 4/1993 |
| JP | 5-163491 | 6/1993 |
| JP | 5-202362 | 8/1993 |
| JP | 7-3267 | 1/1995 |
| JP | 2008150399 | 7/2008 |

OTHER PUBLICATIONS

Rodriguez, Joaquin, et al., Predicting Petroleum Coke Quality From Feedstock Properties, pp. 601-603, Spring 1992, Symposium on Chemistry, available at http://web.anl.gov/PCS/acsfuel/preprint%20archive/Files/37_2_SAN%20FRANCISCO_04-92_0601.pdf.
Wang, Guohua, Molecular Composition of Needle Coke Feedstocks and Mesophase Development During Carbonization, 300 pages, Dec. 2005, The Pennsylvania State University.
Sieli, Gary M., Needle Coke—A Review, 10 pages, May 30, 1991, Foster Wheeler USA Corp.
English language translation of International Preliminary Report on Patentability mailed Apr. 28, 2011 in Pct/jp2009/065496.
Office Action issued with respect to patent family member Chinese Patent Application No. 200980135162.3, mailed Nov. 5, 2012.
Gao et al., "Quality Analysis of Needle Cokes From Foreign Countries", Carbon Techniques, No. 1, Sum. 124, Dec. 31, 2003, pp. 27-31.

* cited by examiner

*Primary Examiner* — Ellen McAvoy
(74) *Attorney, Agent, or Firm* — Greenblum & Bernstein, P.L.C.

(57) ABSTRACT

The invention provides a stock oil composition for needle coke for a graphite electrode, the stock oil composition having a 10 vol % distillation temperature of 280° C. or higher as the distillation property, and when separated into the aromatic component and non-aromatic component by elution chromatography, having an aromatic component content of 30-80 wt % with respect to the total weight of the stock oil composition and an aromatic component molecular weight of 255-1300, as well as a non-aromatic component normal paraffin content of at least 5 parts by weight with respect to 100 parts by weight of the aromatic component.

6 Claims, No Drawings

PROCESS FOR PRODUCING NEEDLE COKE FOR GRAPHITE ELECTRODE AND STOCK OIL COMPOSITION FOR USE IN THE PROCESS

TECHNICAL FIELD

The present invention relates to a stock oil composition for use in production of needle coke for a graphite electrode. The invention further relates to a process for producing needle coke for a graphite electrode using the stock oil composition.

BACKGROUND ART

Needle coke, used in the aggregates of graphite electrodes for electric steelmaking, is commonly produced using petroleum-based heavy oil or coal tar as the starting material. In graphite electrode production steps, coke grains and a binder pitch are first mixed in a prescribed proportion and hot-kneaded, and then extrusion-molded to form a green electrode. The green electrode is then fired and graphitized, and machined to obtain a graphite electrode product.

Graphite electrodes are used under harsh conditions, such as in high-temperature atmospheres, and are therefore desired to have low thermal expansion coefficients (CTE). That is, a smaller thermal expansion coefficient reduces electrode wear during electric steelmaking, and can reduce costs in electric steelmaking.

Methods for controlling the thermal expansion coefficient during production of needle coke are therefore being investigated, and various methods have been proposed. For example, Patent document 1 discloses a process in which an oligomer, which is QI-removed pitch obtained by essential removal of the quino line insolubles from a coal tar-based starting material, and having a modified polymerization degree, is added and delayed coking is performed directly for coking. Also, Patent document 2 discloses a process in which a stock oil is prepared by mixing coal tar-based heavy oil and petroleum-based heavy oil in a proportion so that the nitrogen content is no greater than 1.0 wt % and the sulfur content is no greater than 1.4 wt %, and the stock oil is loaded into a delayed coker to produce raw coke, after which the obtained raw coke is calcined in a temperature range of 700-900° C., temporarily cooled, and then re-calcined in a temperature range of 1200-1600° C. Furthermore, Patent document 3 discloses a process in which, during production of coal tar by rapid thermal decomposition of coal, the thermal decomposition temperature in the reactor is kept at above 750° C., and the residence time of the thermal decomposition product in the reactor is limited to no longer than 5 seconds to obtain a liquid product, the liquid product or the pitch contained therein being carbonized. In Patent document 4, there is disclosed a process in which petroleum-based heavy oil alone or a mixture of the petroleum-based heavy oil with coal tar-based heavy oil from which the quinoline-insolubles have been previously removed, is used as stock oil for delayed coking to produce needle coke, for which process the petroleum-based heavy oil used is pre-modified so that the content of particles such as ash is in the range of 0.05-1 wt %.

CITATION LIST

Patent Literature

[Patent document 1] Japanese Unexamined Patent Application Publication HEI No. 5-105881

[Patent document 2] Japanese Unexamined Patent Application Publication HEI No. 5-163491

[Patent document 3] Japanese Unexamined Patent Application Publication HEI No. 5-202362

[Patent document 4] Japanese Unexamined Patent Application Publication HEI No. 7-3267

SUMMARY OF INVENTION

Technical Problem

Incidentally, graphite electrodes used in electric steelmaking undergo significant wear because they are used under harsh conditions including high-temperature atmospheres, while the demand for and production volume of iron and steel continue to increase year by year. Considering these circumstances, graphite electrodes with low wear and high thermal shock resistance are in great demand for efficient production of iron and steel. The major cause of graphite electrode wear is the cracking that occurs by thermal expansion during use at high temperatures of 3000° C., as the cracking leads to graphite electrode loss and fracture. It is therefore highly desirable to develop needle coke with an even smaller thermal expansion coefficient.

However, the needle coke obtained by the processes described in Patent documents 1-4 do not have sufficiently small thermal expansion coefficients, and at the current time it does not meet the level required for graphite electrode aggregates for electric steelmaking.

The present invention has been accomplished in consideration of this problem of the prior art, and one of its objects is to provide a stock oil composition that is useful for production of needle coke for a graphite electrode having a sufficiently small thermal expansion coefficient. Another object of the invention is to provide a process for producing needle coke for a graphite electrode that employs the aforementioned stock oil composition.

Solution to Problem

The present inventors have focused on the mechanism of production of needle coke and have completed this invention upon finding that the problem described above can be overcome by maximum attention to the mechanism. Specifically, production of needle coke for a graphite electrode with a small thermal expansion requires production of a satisfactory mesophase during thermal decomposition and polycondensation reaction in the process of coking of a stock oil composition, and orientation of the crystal structure of the bulk mesophase along one axis by stress induced by appropriate gas generation, during bulk formation and solidification. In the course of producing needle coke for a graphite electrode from a stock oil composition, it is extremely important to control the makeup of the stock oil composition serving as the starting material, in order to satisfactorily conduct the process.

The present invention therefore provides a stock oil composition for needle coke for a graphite electrode, the stock oil composition having a 10 vol % distillation temperature of 280° C. or higher as the distillation property, and when separated into the aromatic component and non-aromatic component by elution chromatography, having an aromatic component content of 30-80 wt % with respect to the total weight of the stock oil composition and an aromatic component molecular weight of 255-1300, as well as a non-aromatic component normal paraffin content of at least 5 parts by weight with respect to 100 parts by weight of the aromatic component.

A stock oil composition having such a makeup allows production of a satisfactory mesophase during thermal decomposition and polycondensation reaction in the process of coking of a stock oil composition, and satisfactory orientation of the crystal structure of the bulk mesophase by stress induced by appropriate gas generation, during bulk formation and solidification. It is thus possible to obtain needle coke for a graphite electrode, having a sufficiently small thermal expansion coefficient.

The phrase "the 10 vol % distillation temperature, as the distillation property", according to the invention, is the value measured based on JIS K2254, "Petroleum Products—Distillation Test Methods". "Elution chromatography" is a method of separation of a stock oil composition into two components (the aromatic component and non-aromatic component), according to the method described by ASTM D2549. Specifically, 8 g of the stock oil composition dissolved in 20 mL of n-pentane or cyclohexane is passed through a column packed with active alumina and silica gels. Next, 130 mL of n-pentane is passed through the column at a speed of 3 mL/min, for elution of the non-aromatic component into the n-pentane. The non-aromatic component eluted into the n-pentane is recovered and quantitated. Next, 100 mL of diethyl ether, 100 mL of chloroform and 175 mL of ethyl alcohol are passed through the column in that order at a speed of 3 mL/min, for elution of the aromatic component into those solvents. The non-aromatic component eluted into the solvents is recovered and quantitated.

The aromatic and non-aromatic components with respect to the total weight of the stock oil composition are the values calculated by the following formulas (1) and (2), respectively. In the formulas, A and B represent the aromatic component and non-aromatic component, respectively, obtained by separation treatment by the elution chromatography.

$$\text{Aromatic component(wt \%)} = A/(A+B) \times 100 \quad (1)$$

$$\text{Non-aromatic component(wt \%)} = B/(A+B) \times 100 \quad (2)$$

The term "aromatic component molecular weight", according to the invention, refers to the value measured by a vapor pressure equilibrium method. Specifically, using a molecular weight measuring apparatus (Model 117 by Hitachi, Ltd.), n-cetane used as the reference sample with known molecular weight is dissolved in cyclohexane and injected into the measuring apparatus, and a calibration curve is drawn for the relationship between molar concentration and difference in potential. Next, the aromatic component sample is measured in the same manner as the reference sample, the molar concentration is determined from the difference in potential, and the average molecular weight is calculated.

In the stock oil composition of the invention, the amount of normal paraffins in the non-aromatic component is preferably at least 3 wt % with respect to the total weight of the stock oil composition. This will help control excessive increase in the matrix viscosity when the mesophase is generated in the process of coking the stock oil composition, and minimize abrupt coalescence.

The amount of normal paraffins in the non-aromatic component is the value measured using a capillary column-mounted gas chromatograph. Specifically, after verification of normal paraffins with a standard substance, a non-aromatic component sample separated by elution chromatography is passed through the capillary column for measurement.

The invention further provides a process for producing needle coke for a graphite electrode, the process comprising the steps of: blending two or more stock oils to prepare the stock oil composition; and coking the stock oil composition with a delayed coker at 400-600° C. and then calcining it at 1000-1500° C.

Advantageous Effects of Invention

According to the invention there is provided a stock oil composition that is useful for production of needle coke for a graphite electrode having a sufficiently small thermal expansion coefficient. Using needle coke with a sufficiently small thermal expansion coefficient as coking carbon allows a graphite electrode with high thermal shock resistance to be obtained.

DESCRIPTION OF EMBODIMENTS

Preferred embodiments of the invention will now be described in detail.

The stock oil composition of this embodiment has a 10 vol % distillation temperature, as the distillation property, of preferably 280° C. or higher, more preferably 300° C. or higher and even more preferably 330° C. or higher. Needle coke produced from a stock oil composition having a 10 vol % distillation temperature of below 280° C. tends to have an increased thermal expansion coefficient, and is not desirable. The reason for the increased thermal expansion coefficient is believed to be that the small molecular weight component in the fraction having a distillation temperature of below 280° C. forms numerous isotropically structured areas called "non-mesogen" during the coking process, which are not mesophase, with the result that in the case of uniaxial orientation, a bulk mesophase enveloping an isotropic structure forms, and the isotropically structured sections become defects that adversely affect the uniaxial orientation.

When separated into the aromatic component and non-aromatic component by elution chromatography, the stock oil composition of this embodiment has an aromatic component content of 30-80 wt % with respect to the total weight of the stock oil composition and an aromatic component molecular weight of 255-1300, as well as a non-aromatic component normal paraffin content of at least 5 parts by weight with respect to 100 parts by weight of the aromatic component.

The aromatic component content with respect to the total weight of the stock oil composition is 30-80 wt % as mentioned above, but is preferably 35-75 wt % and more preferably 40-75 wt %. This condition is indispensable for production and growth of a satisfactory mesophase. If the aromatic component content is less than 30 wt %, the yield of coke from the stock oil composition will be drastically reduced. On the other hand, an aromatic component content of greater than 80 wt % results in a drastic increase in mesophase generation in the matrix during the course of coke production. This causes coalescence rather than single growth of the mesophase, whereby the coke structure becomes deformed and coke with a small coefficient of thermal expansion (CTE) becomes difficult to obtain.

The molecular weight of the aromatic component is 255-1300 as mentioned above, but it is preferably 270-1100 and more preferably 275-1000. This condition is indispensable for production and growth of a satisfactory mesophase. If the aromatic component molecular weight is less than 255, mesophase production will be inadequate. If the aromatic component molecular weight is greater than 1300, on the other hand, the mesophase will be prematurely generated during the coke production process, thus promoting coke formation before growth so that coke with a small "mosaic" structure is obtained. Because such coke has a large thermal expansion coefficient, it cannot be easily used as a carbon starting material for a graphite electrode.

Normal paraffins suitably present in the stock oil composition are effective for orienting the crystals in the uniaxial direction during solidification of the mesophase in the coke production process. The amount of normal paraffins in the non-aromatic component is at least 5 parts by weight with respect to 100 parts by weight of the aromatic component, as mentioned above, but it is preferably at least 7 parts by weight. If the amount of normal paraffins is less than 5 parts by weight based on the weight of the aromatic component, it will not be possible to sufficiently orient the mesophase in the uniaxial direction, resulting in an undesirable random structure. The upper limit for the amount of normal paraffins based on the weight of the aromatic component is preferably 45 parts by weight and more preferably 40 parts by weight. If the amount of normal paraffins exceeds 45 parts by weight, gas generated from the normal paraffins will be excessive and will tend to push the orientation of the bulk mesophase instead in a random direction. This will result in a fine mosaic structure for the coke, and will increase the thermal expansion coefficient.

The amount of normal paraffins in the non-aromatic component is preferably at least 3 wt % and more preferably at least 10 wt %, based on the total weight of the stock oil composition. If the amount of normal paraffins based on the total weight of the stock oil composition is less than 3 wt %, the matrix viscosity will increase during mesophase generation resulting in rapid coalescence, which is undesirable. The upper limit for the normal paraffin based on the weight of the stock oil composition is preferably 30 wt % and more preferably 25 wt %. Because a large portion of the normal paraffins gasify during coking, a normal paraffin amount above 30 wt % results in a low coke yield and renders the process unsuitable as a production process for commercial production.

The stock oil composition of this embodiment can be obtained by blending two different types of stock oil so that the aforementioned conditions are satisfied. The stock oil may be bottom oil of fluidized catalytic cracking oil (FCC DO), highly hydrodesulfurized heavy oil, vacuum residual oil (VR), coal liquefaction oil, coal solvent extraction oil, ordinary pressure residual shale oil, tar sand bitumen, naphtha tar pitch, coal tar pitch and heavy oil from hydrorefining of the foregoing. When two or more stock oils are blended to prepare the stock oil composition, the blending ratio may be appropriately adjusted according to the properties of the stock oils used. The stock oil properties will vary depending on the type of crude oil and on the treatment conditions employed until the stock oil is obtained from the crude oil.

The method for coking the stock oil composition satisfying the prescribed conditions is preferably a delayed coking method. More specifically, the stock oil composition is preferably heat treated with a delayed coker under pressurized conditions to obtain raw coke, after which the raw coke is calcined in a rotary kiln, shaft kiln or the like to produce needle coke. The conditions in the delayed coker are preferably a pressure of 300-800 kPa and a temperature of 400-600° C. The calcining temperature is preferably 1000-1500° C.

The method for manufacturing a graphite electrode product from the needle coke obtained in this manner may be one in which a starting material comprising a suitable amount of binder pitch added to needle coke is hot-kneaded and then extrusion molded to produce a green electrode, after which the green electrode is baked for graphitization, and then machined.

By using a stock oil composition according to this embodiment, it is possible to produce needle coke for a graphite electrode having a sufficiently small thermal expansion coefficient. In addition, separation of the stock oil composition used into the aromatic component and non-aromatic component by elution chromatography and analysis of the stock oil composition (aromatic component content, aromatic component molecular weight and normal paraffin content of the non-aromatic component) allows efficient selection of a stock oil composition suitable for production of needle coke for a graphite electrode having a sufficiently small thermal expansion coefficient.

EXAMPLES

The present invention will now be explained in greater detail based on examples and comparative examples, with the understanding that these examples are in no way limitative on the invention.

Examples 1-4 and Comparative Examples 1-5

Different heavy oils were blended to prepare 9 different stock oil compositions. The 9 stock oil compositions were each separated by elution chromatography and analyzed, giving the results shown in Tables 1 and 2. Each stock oil composition was also heat treated at 500° C. for 3 hours to form raw coke, and the obtained raw coke was fired at 1000° C. for 5 hours to obtain calcined coke (needle coke). The thermal expansion coefficients of the obtained calcined coke are shown in Tables 1 and 2.

TABLE 1

|  |  | Example 1 | Example 2 | Example 3 | Example 4 |
|---|---|---|---|---|---|
| 10 Vol % distillation temperature (° C.) as distillation property | | 320 | 344 | 384 | 385 |
| Aromatic component content (wt %) | | 68 | 60 | 47 | 55 |
| Aromatic component molecular weight | | 285 | 330 | 510 | 780 |
| Amount of normal paraffins in non-aromatic component | Based on total weight of stock oil composition (wt %) | 5 | 15 | 16 | 17 |
|  | Based on 100 parts by wt. of aromatic component (parts by wt.) | 7 | 25 | 34 | 31 |
| Thermal expansion coefficient of calcined coke ($\times 10^{-6}$/° C.) | | 1.2 | 1.1 | 1.1 | 1.3 |

TABLE 2

|  | Comp. Example 1 | Comp. Example 2 | Comp. Example 3 | Comp. Example 4 | Comp. Example 5 |
|---|---|---|---|---|---|
| 10 Vol % distillation temperature (° C.) as distillation property | 366 | 318 | 520 | 347 | 240 |
| Aromatic component content (wt %) | 90 | 78 | 30 | 20 | 79 |
| Aromatic component molecular weight | 272 | 220 | 2000 | 350 | 280 |
| Amount of normal paraffins in non-aromatic component — Based on total weight of stock oil composition (wt %) | 3 | 2 | — | 20 | 4 |
| Amount of normal paraffins in non-aromatic component — Based on 100 parts by wt. of aromatic component (parts by wt.) | 3 | 3 | — | 100 | 5 |
| Thermal expansion coefficient of calcined coke ($\times 10^{-6}$/° C.) | 1.9 | 1.7 | 1.9 | 1.7 | 1.6 |

The stock oil compositions of Examples 1-4 shown in Table 1 had 10 vol % distillation temperatures of 280° C. or higher as the distillation property, aromatic component contents of 30-80 wt %, and aromatic component molecular weights of 255-1300, while the normal paraffin contents of their non-aromatic components were >5 parts by weight with respect to 100 parts by weight of their aromatic components. The calcined cokes (needle cokes) obtained from these stock oil compositions had thermal expansion coefficients of 1.1-1.3×10$^{-6}$/° C., which were smaller values than those of the stock oil compositions of Comparative Examples 1-5 shown in Table 2.

Industrial Applicability

According to the invention there is provided a stock oil composition that is useful for production of needle coke for a graphite electrode having a sufficiently small thermal expansion coefficient. Using needle coke with a sufficiently small thermal expansion coefficient as coking carbon allows a graphite electrode with high thermal shock resistance to be obtained.

The invention claimed is:

1. A process for producing needle coke for a graphite electrode, the process comprising:
   (A) blending two or more stock oils to prepare a stock oil composition;
   (B) determining a 10 vol % distillation temperature of the stock oil composition;
   (C) separating the stock oil composition into an aromatic component and a non-aromatic component;
   (D) determining an aromatic component content with respect to the total weight of the stock oil composition, an aromatic component molecular weight, and a non-aromatic component normal paraffin content;
   (E) when the stock oil composition meets all of conditions i) to iv):
   i) the 10 vol % distillation temperature is 280° C. or higher;
   ii) the aromatic component content is 30-80 wt % with respect to the total weight of the stock oil composition;
   iii) the aromatic component molecular weight is 255-1300;
   iv) the non-aromatic component normal paraffin content is at least 5 parts by weight with respect to 100 parts by weight of the aromatic component;
   coking the stock oil composition with a delayed coker at 400-600° C. to obtain a coke, and calcining the coke at 1000-1500° C. to obtain needle coke; and
   (F) when the stock oil composition does not meet all of conditions i) to iv), adjusting the stock oil composition and performing (B), (C), (D), and (E) on the adjusted stock oil composition.

2. The process of claim 1, wherein (F) is repeatedly performed by adding one or more stock oils until a stock oil composition meeting all of conditions i) to iv) is obtained.

3. The process of claim 1, wherein conditions i) to iv) further comprise condition v) the amount of normal paraffin in the non-aromatic component is at least 3 wt % with respect to the total weight of the stock oil composition.

4. The process of claim 2, wherein conditions i) to iv) further comprise condition v) the amount of normal paraffin in the non-aromatic component is at least 3 wt % with respect to the total weight of the stock oil composition.

5. The process of claim 1 wherein the two or more stock oils are selected from one or more of bottom oil of fluidized cracking oil; hydrodesulfurized heavy oil; vacuum residual oil; coal liquifaction oil; coal solvent extraction oil; ordinary pressure residual shale oil; tar sand bitumen; naphtha tar pitch; coal tar pitch; or heavy oil from hydrorefining of any of the foregoing.

6. The process of claim 1 wherein the separating is done by elution chromatography.

* * * * *